US006957947B2

(12) United States Patent
Williams

(10) Patent No.: US 6,957,947 B2
(45) Date of Patent: Oct. 25, 2005

(54) HYDROELECTRIC TURBINE

(76) Inventor: Herbert Lehman Williams, 109 Rivers Edge Dr., E. Palatka, FL (US) 32131

( * ) Notice: Subject to any disclaimer, the term of this patent is extended or adjusted under 35 U.S.C. 154(b) by 0 days.

(21) Appl. No.: 10/633,865

(22) Filed: Aug. 5, 2003

(65) Prior Publication Data

US 2005/0031442 A1 Feb. 10, 2005

(51) Int. Cl.⁷ ................................................. F03B 7/00
(52) U.S. Cl. .................... 415/4.3; 415/220; 415/908; 416/189; 416/DIG. 4
(58) Field of Search ................ 415/4.3, 4.5, 220, 415/228, 229, 908; 416/189, 205, 244 R, 416/DIG. 4; 290/43, 54

(56) References Cited

U.S. PATENT DOCUMENTS

| 3,867,655 A | * | 2/1975 | Stengel et al. | 415/226 |
| 4,272,685 A | * | 6/1981 | Toyama | 416/188 |
| 4,367,413 A | * | 1/1983 | Nair | 416/189 |
| 4,586,871 A | * | 5/1986 | Glass | 415/202 |
| 4,648,788 A | * | 3/1987 | Jochum | 415/91 |
| 4,720,640 A | * | 1/1988 | Anderson et al. | 416/179 |
| 6,194,798 B1 | * | 2/2001 | Lopatinsky | 417/356 |
| 6,798,080 B1 | * | 9/2004 | Baarman et al. | 415/905 |
| 6,806,586 B2 | * | 10/2004 | Wobben | 290/53 |

* cited by examiner

Primary Examiner—Edward K. Look
(74) Attorney, Agent, or Firm—Thomas C. Saitta

(57) ABSTRACT

A hydroelectric turbine anchored in a body of water which produces electricity directly from its housing. The turbine is in and of itself a generator whose housing is its stator and whose blade it its rotor.

18 Claims, 2 Drawing Sheets cross section A - A¹ front view

Water flow cross section A - A¹

HYDROELECTRIC TURBINE

BACKGROUND OF THE INVENTION

In existing hydro systems, whether low or high head, the runner (or blade) converts rotational energy to torque energy in a shaft. U.S. Pat. No. 98,552 is a common type shaft driven turbine. Patent Ser. No. 09/231,063 is a more recent open center, peripherally driven turbine. The embodiment eliminates the shaft. It converts flow energy directly to electricity by the use of magnets imbedded in the periphery of its blade and cores imbedded in its housing. As the blade is rotated by the flow, electricity is produced in the windings of the core.

The embodiment is a combination of what is old (the open center turbine) and what is new (a free floating turbine blade which is a rotor).

BRIEF SUMMARY OF THE INVENTION

Present turbine designs, whether open center or central shaft type, produce electricity by the use of generators. This invention produces electricity by combining the turbine and generator in one unit. Instead of the hydroelectric turbine producing the energy to turn a generator, the hydroelectric turbine is the generator.

A water flow through the rotor blade causes the rotor blade to rotate. The rotation of the blade causes a magnetic field necessary to produce electricity from the coils. The coils are connected together in such a way as to produce the desired voltage and current to pass through conductors to an electrical land based grid.

The opposing force of one group of magnets aid in maintaining alignment of the rotor blade on its horizontal axis.

The opposing force of another group of magnets, in conjunction with a water lubricated bearing material, aid in preventing the rotor blade from being forced downstream.

An additional aspect of the embodiment is that the rotor (blade) is free floating in the turbine housing and is not mechanically attached to the housing. Central alignment has been achieved by embedding opposing magnets in both the blade periphery and the housing interior on a plane perpendicular to the axis of the turbine. To prevent the blade from being forced downstream by the water flow, opposing magnets have been embedded in the blade periphery and the housing parallel to the axis. To prevent the blade from moving forward or falling out of the housing during shut down or maintenance, stops are mechanically attached to the interior of the housing upstream of the blade.

The magnetic field necessary to produce electricity occurs inside a non-magnetic material which:

a. eliminates excessive saltwater which is not compatible with the high intensity magnetic field necessary for the production of electricity;
b. acts as a bearing surface to help maintain horizontal alignment of the blade (rotor).

DETAILED DESCRIPTION OF THE INVENTION

Figure 1:
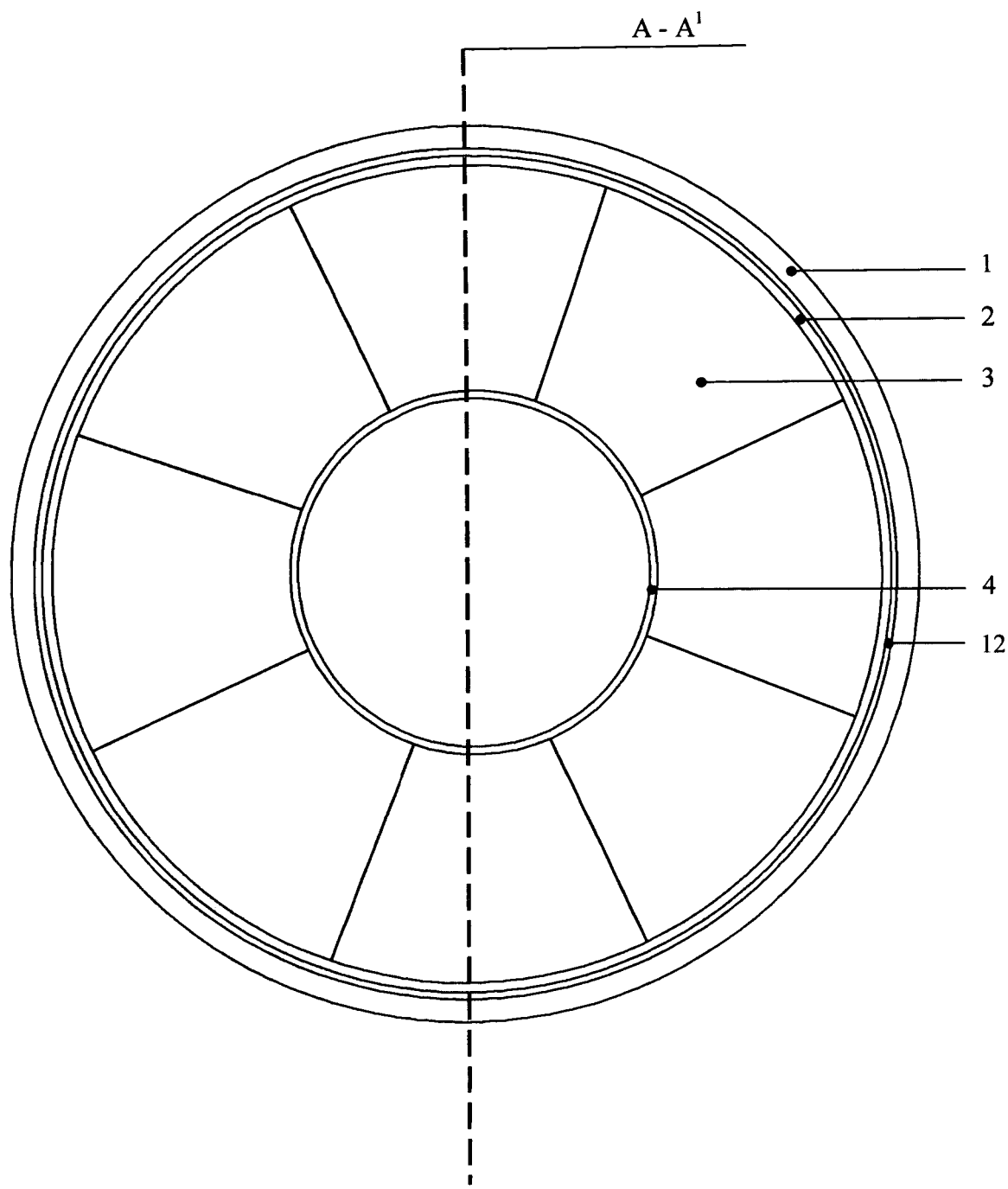
FIG. 1 is a front view of the open center hydroelectric turbine without stops (for sake of clarity).
Figure 2:
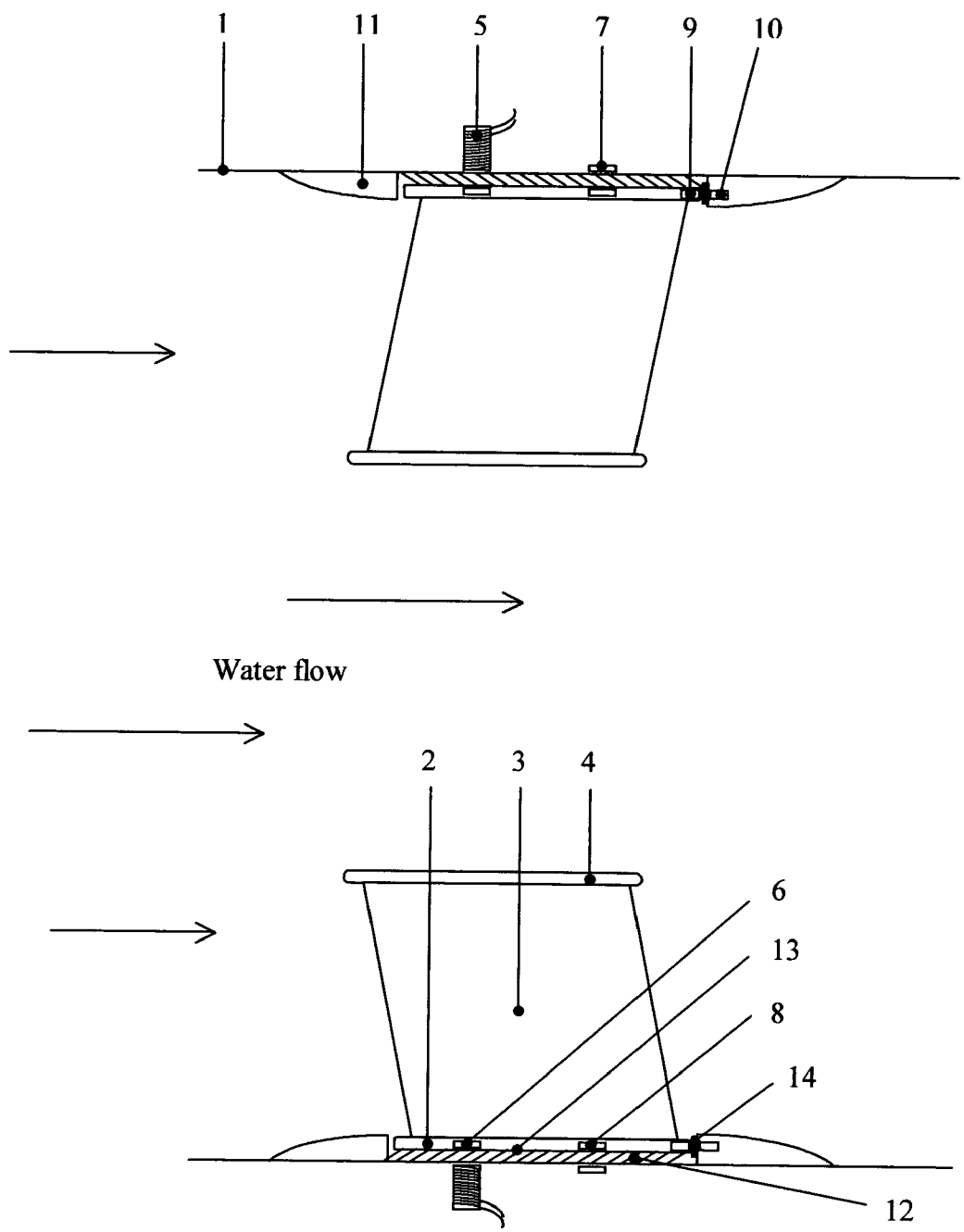
FIG. 2 is a cross-section view taken at the centerline of the turbine section.

The housing (1) is either anchored in a body of water (low head application), fixed in a dam (high head application) or attached to the interior of a pipe. Whatever the application, housing (1) is stationary.

The outer rim (2), blade (3), inner rim (4), magnet (6), magnet (8) and magnet (9) are fixed as one unit and rotated by the water flow.

The magnet (6) and core with windings (5) do the work of producing electricity.

The magnets (8) and (7) do the work of alignment to the axis.

The magnets (9) and (10) prevent blade (3) from being pushed downstream by the water flow.

The stop (11) prevents the runner from moving upstream.

The stator housing (1) has two groups of magnets, (7) and (10). The rotor blade (3) has three groups of magnets (6), (8) and (9) mechanically attached to its outer rim (2). The group (6) magnets are arranged to produce the magnetic field necessary to produce electricity when passed by the coils (5) of the stator housing (1). The group (7) and (8) magnets are arranged with like poles facing each other to produce the repelling or opposing force necessary to aid in alignment of the rotating blade (3) on its horizontal axis. The group (9) and (10) magnets are arranged like poles facing each other to produce the repelling or opposing force necessary to prevent the rotor blade (3) from being forced downstream.

The strator housing (1) has a water lubricated bearing material (12) mechanically attached to its inner surface to aid the group (7) and (8) magnets in maintaining alignment on its horizontal axis. The rotor blade (3) has a metallic or porcelain like surface (13) on its outer rim (2) which contacts the water lubricated non-magnetic bearing material (12) when the group (7) and (8) magnets of the blade fail to maintain alignment on its horizontal axis.

The stator housing (1) has a water lubricated bearing material (14) mechanically attached to its inner surface to aid the group (9) and (10) magnets in preventing the rotor blade (3) from being forced downstream.

The area necessary between the rotor blade (3) and the stator housing (1) in order to produce electricity is maintained by the group (7) and (8) magnets, the water lubricated non-magnetic bearing material (12), and the surface (13).

The non-magnetic bearing material (12) occupies the area between the core with windings (5) and the rotor (blade) surface (13) thereby displacing saltwater.

What is claimed is:

1. A hydroelectric turbine comprising a rotor and three distinctly separate groups of magnets: a first group of magnets arranged to produce the magnetic field necessary to produce electricity; a second group of magnets arranged with similar poles facing each other to maintain alignment of the rotor; and, a third group of magnets arranged with similar poles facing each other to prevent rotor from being forced downstream by the force of the water against the rotor.

2. The hydroelectric turbine of claim 1 which produces electricity without the use of a central shaft.

3. The hydroelectric turbine of claim 1, wherein said rotor comprises at least one blade.

4. The hydroelectric turbine of claim 1, wherein said rotor comprises an outer rim, at least one blade and an inner rim.

5. The hydroelectric turbine of claim 4, further comprising a stator housing, and wherein said rotor is not physically connected to said stator housing.

6. The hydroelectric turbine of claim 5, wherein said second group of magnets and said third group of magnets separate said rotor from said stator housing.

7. The hydroelectric turbine of claim 5, further comprising a water lubricated bearing material attached to said stator housing.

8. The hydroelectric turbine of claim 5, further comprising a metallic surface disposed on said outer rim.

9. The hydroelectric turbine of claim 5, further comprising a porcelain surface disposed on said outer rim.

10. The hydroelectric turbine of claim 1, wherein said rotor is maintained in position solely by action of said second group of magnets and said third group of magnets.

11. A hydroelectic turbine comprising:
  a stationary stator housing;
  a rotor comprising an outer rim, at least one blade and an inner rim, said rotor disposed within said stator housing and turned by downstream water flow; and
  a first group of magnets arranged to produce the magnetic field necessary to produce electricity; a second group of magnets arranged with similar poles facing each other to maintain alignment of said rotor within said stator housing; and a third group of magnets arranged with similar poles facing each other to prevent said rotor from being forced downstream and out of said stator housing by the downstream water flow.

12. The hydroelectric turbine of claim 11 which produces electricity without the use of a central shaft.

13. The hydroelectric turbine of claim 11, wherein said rotor is not physically connected to said stator housing.

14. The hydroelectric turbine of claim 11, wherein said second group of magnets and said third group of magnets separate said rotor from said stator housing.

15. The hydroelectric turbine of claim 11, further comprising a water lubricated bearing material attached to said stator housing.

16. The hydroelectric turbine of claim 11, further comprising a metallic surface disposed on said outer rim.

17. The hydroelectric turbine of claim 11, further comprising a porcelain surface disposed on said outer rim.

18. The hydroelectric turbine of claim 11, wherein said rotor is maintained in position solely by action of said second group of magnets and said third group of magnets.

* * * * *